Patented June 19, 1928.

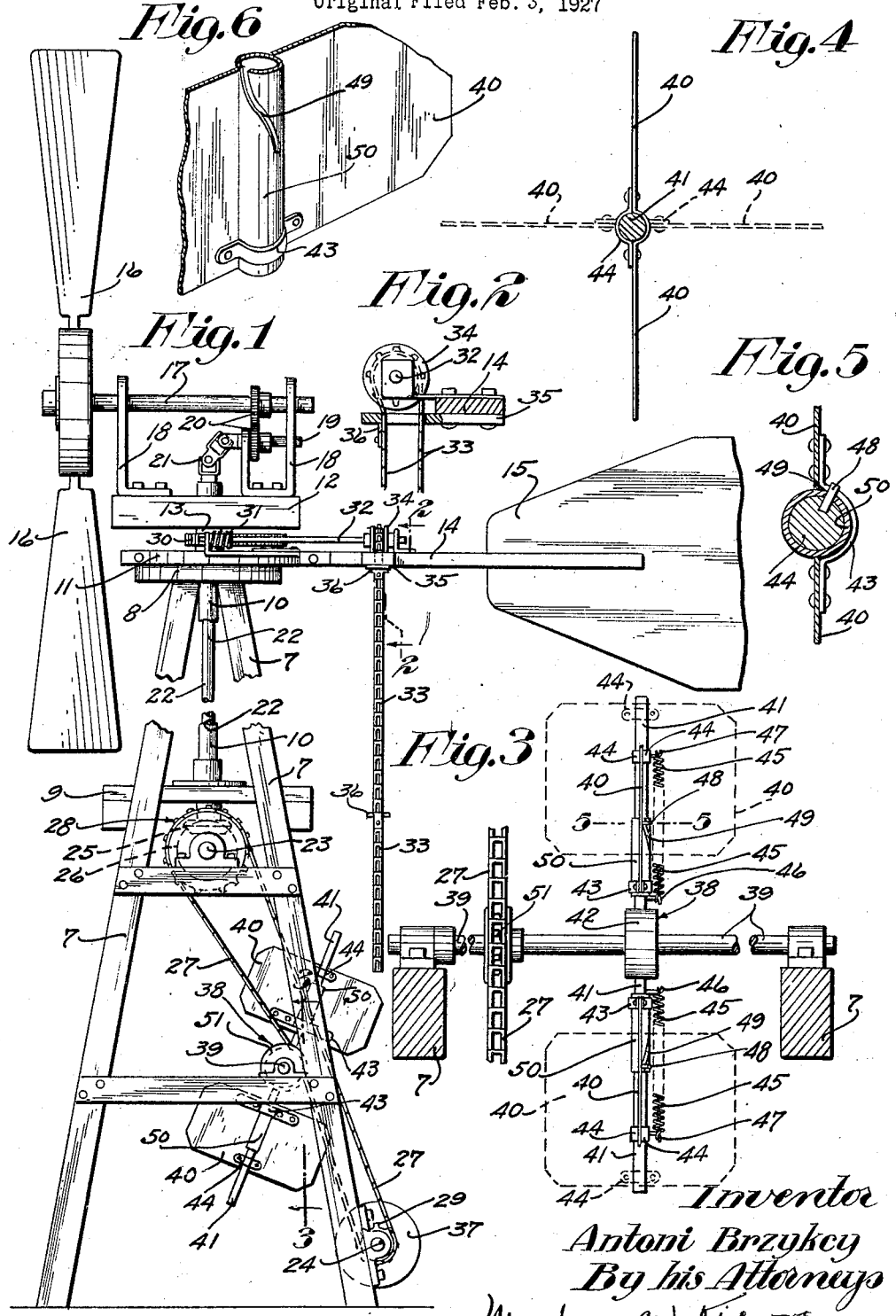

1,674,316

UNITED STATES PATENT OFFICE.

ANTONI BRZYKCY, OF MINNEAPOLIS, MINNESOTA.

WINDMILL.

Application filed February 3, 1927, Serial No. 165,731. Renewed May 7, 1928.

My present invention relates to improvements in windmills, and more particularly to transmission mechanism and a governor therefor.

Generally stated, the invention consists of the novel devices and combinations of devices hereinafter described and defined in the claims.

In the accompanying drawings, which illustrate the invention, like characters indicate like parts throughout the several views.

Referring to the drawings:

Fig. 1 is a side elevation of the improved windmill, with some parts broken away;

Fig. 2 is a detail view with some parts sectioned on the irregular line 2—2 of Fig. 1;

Fig. 3 is a view of the governor with some parts of the windmill tower sectioned on the line 3—3 of Fig. 1, on an enlarged scale, and with some parts of said governor shown in different positions by means of broken lines;

Fig. 4 is an edge elevation of one of the governor blades with the arm thereof shown in section, and also illustrating said blade in a different position by means of broken lines;

Fig. 5 is a detail view principally in section taken on the line 5—5 of Fig. 3, on an enlarged scale; and Fig. 6 is a fragmentary perspective view of one of the governor blades.

The numeral 7 indicates a windmill tower of the usual construction, having at its top a turntable 8 and below said turntable a platform 9. A vertical tubular shaft 10 extends centrally within the tower 7 through the turntable 8 and platform 9 and is journaled in bearings thereon. Rotatably mounted on the turntable 8 is a lower head 11 which is free to turn about the axis of the shaft 10. Keyed to the shaft 10 is an upper head 12 having a depending hub 13 which spaces said upper head from the lower head 11. The lower head 11 is provided with a horizontal shank 14 having a vane 15.

A wind wheel 16, of the usual or any desired construction, is keyed to a horizontal shaft 17 journaled in bearings 18 on the upper head 12. Journaled in one of the bearings 18, below the shaft 17, is a stub shaft 19 which extends parallel to said shaft 17. Spur gears 20 connect the shaft 17 to the stub shaft 19 and a flexible coupling 21 connects the stub shaft 19 to the upper end of a shaft 22 journaled in the tubular shaft 10. Journaled in bearings on the tower 7 is an upper countershaft 23 and a lower countershaft 24. On the lower end of the shaft 22 is a bevel pinion 25 which meshes with a bevel gear 26 on the countershaft 23 and drives said countershaft from the shaft 22. The lower countershaft 24 is driven from the upper countershaft 23 by a sprocket chain 27 which runs over a large sprocket wheel 28 and a small sprocket wheel 29 on the countershaft 24.

To swing the wind wheel 16 into and out of the wind and in respect to the vane 15, there is formed with the hub 13 of the upper head 12 a segmental worm gear 30 with which meshes a worm 31 on a shaft 32 journaled in bearings on the lower head 11 and shank 14. To manually rotate the shaft 32 there is provided a sprocket chain 33 which runs over a small sprocket wheel 34 on said shaft. This sprocket wheel 34 is flanged to prevent the sprocket chain 33 from running off the same, and which chain extends within easy reach from the ground where the same may be operated. The sprocket chain 33 hangs through an aperture in a guide block 35 on the shank 14 and has secured thereto a pair of stops 36 arranged to engage the under side of said block and limit the movement of the sprocket chain 33 over the sprocket wheel 34 after imparting a swinging movement of 90 degrees to the wind wheel 16. One of these stops is arranged to engage the guide block 35 when the axis of the wind wheel 16 is in the same vertical plane with the vane 15, and the other of which is arranged to engage said block when the axis of said wheel is at right angles to said vane. Keyed to the countershaft 24 is a pulley 37 from which a machine or other device may be driven by the windmill.

Obviously, the worm gear 30 and co-operating worm 31 lock the head 12 to the head 11 for common movement therewith, or in other words, hold the wind wheel 16 and the vane 15 in said relation in respect to each other.

To control the movement of the wind wheel 16 when the same is driven faster than a predetermined speed so that a comparatively constant speed is imparted to the pulley 37, there is provided a centrifugal governor 38 mounted on a horizontal shaft 39 journaled on the tower 7. This governor 38 comprises a pair of flat blades 40 mounted on a pair of axially aligned radial arms 41 on a hub 42 on the countershaft 39. The blades 40 are secured to the arms 41 by inner and outer intermediate bearings 43 and 44, respectively, that are loose on said arms and permit said blades to turn about said arms and move longitudinally thereon. The blades 40 are yieldingly held retracted by coiled springs 45, the inner ends of which are anchored at 46 to the arms 41, inward of the blades 40, and the outer ends of which are attached at 47 to said blades.

Normally, the blades 40 are set edgewise in a vertical plane that extends at a right angle to the shaft 39, as best shown in Fig. 1, or in other words, they extend edgewise to the direction of rotation of the shaft 30 so that they cut through the air with the least resistance. Said blades 40, when acting with their greatest efficiency to retard the movement of the wind wheel 16, extend at right angles to their normal position or in other words they extend flatwise in the direction of rotation of the shaft 39 in order to produce their greatest resistance. To hold the blades 40 in their normal position and impart thereto a quarter turn when moved to their extreme outer positions and then returned to their normal positions, there are secured to the arms 41, pins 48 which work in cam slots 49 in sleeve-like extensions 50 on the inner bearings 43. The shaft 39 is driven by the sprocket chain 27 which runs over a small flanged sprocket wheel 51 on the shaft 39.

Obviously, under an increased speed of the shaft 39 over the predetermined speed thereof, the blades 40 will be thrown outward on the arm 41 against the tension of the springs 45, and the pins 48, working in the cam slots 49, will move the blades 40 into the wind in which they are oblique to their direction of rotation until finally, if the speed of said shaft increases, they extend at right angles to their normal position and offer their greatest resistance to the wind.

When the speed of the shaft 39 decreases, the springs 45 will return the blades 40 to their normal position.

What I claim is:

1. In a windmill, the combination with a rotatable head, of a wind wheel having a shaft journaled on said head, a stub shaft journaled on said head, driving connections from the wind wheel shaft to the stub shaft, a driven shaft perpendicular to the stub shaft, and a flexible coupling connecting the stub shaft to the driven shaft.

2. In a windmill, the combination with a turn table, of a vane having a shank mounted on the turn table to swing about the axis thereof, a head mounted to turn about said axis, a wind wheel journaled on said head, and means for turning the head in respect to the shank, including a cable having stops for positioning the wind wheel in its two extreme positions in respect to the vane.

3. In a windmill, the combination with a turn table, of a vane having a shank mounted on the turn table to swing about the axis thereof, a head mounted to turn about said axis, a wind wheel journaled on said head, and means for turning the head in respect to the shank, including a cable having stops for positioning the wind wheel in its two extreme positions in respect to the vane, said connections being adapted to lock the head to the shank for common swinging movement therewith.

4. In a windmill, the combination with a wind wheel, of transmission mechanism leading from the wind wheel, and a centrifugal governor comprising a shaft having a pair of radial arms, blades mounted on said arms for turning movement and axial travelling movement, and yielding means normally holding the blades retracted.

5. In a windmill, the combination with a wind wheel, of transmission mechanism leading from the wind wheel, and a centrifugal governor interposed in said mechanism, said governor comprising a pair of radial arms, blades loosely mounted on said arms for turning movement and axial travelling movement, springs normally holding said blades retracted, and pins and co-operating cam slots for causing said blades to turn on the arms during their axial travelling movement.

In testimony whereof I affix my signature.

ANTONI BRZYKCY.